UNITED STATES PATENT OFFICE.

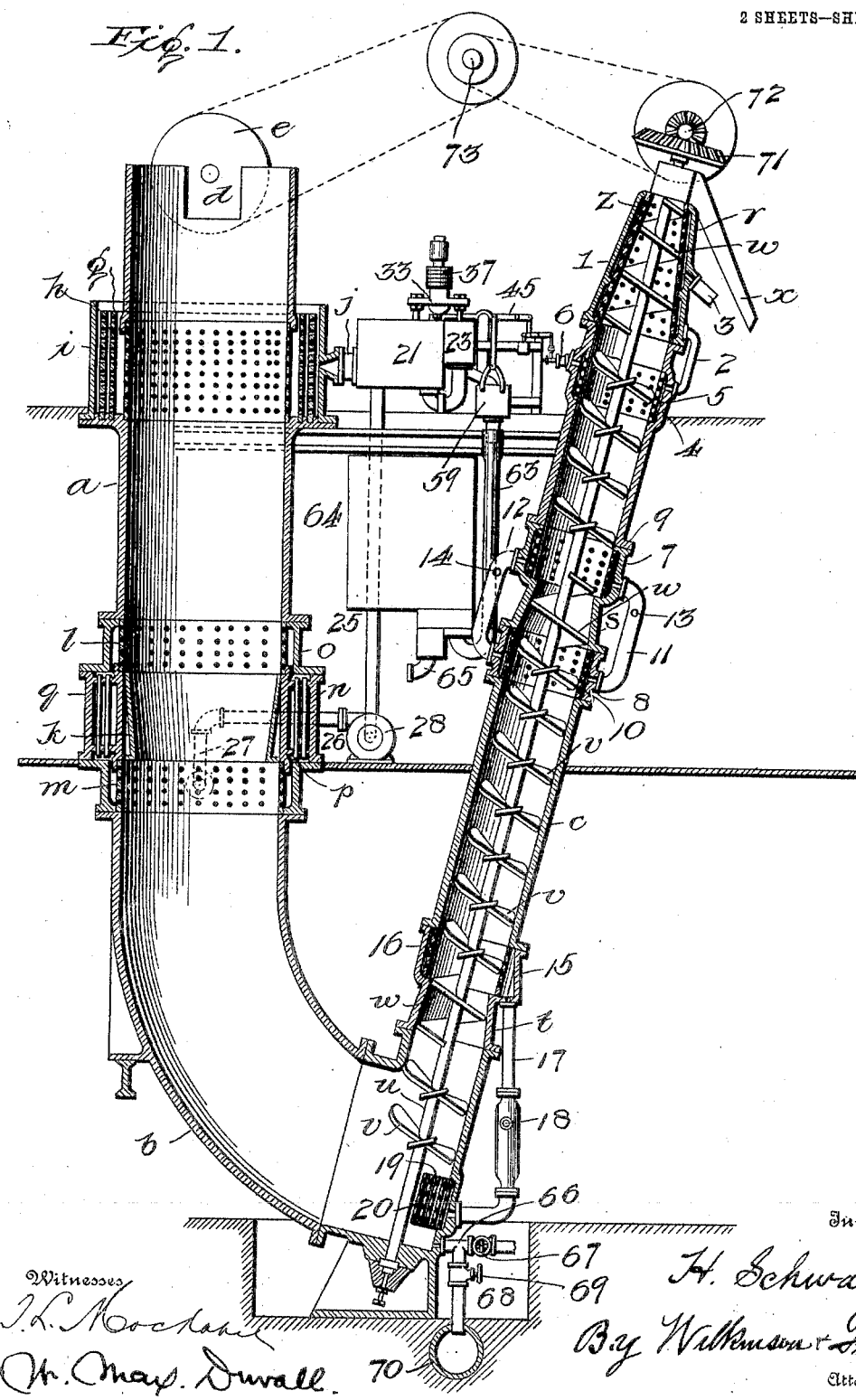

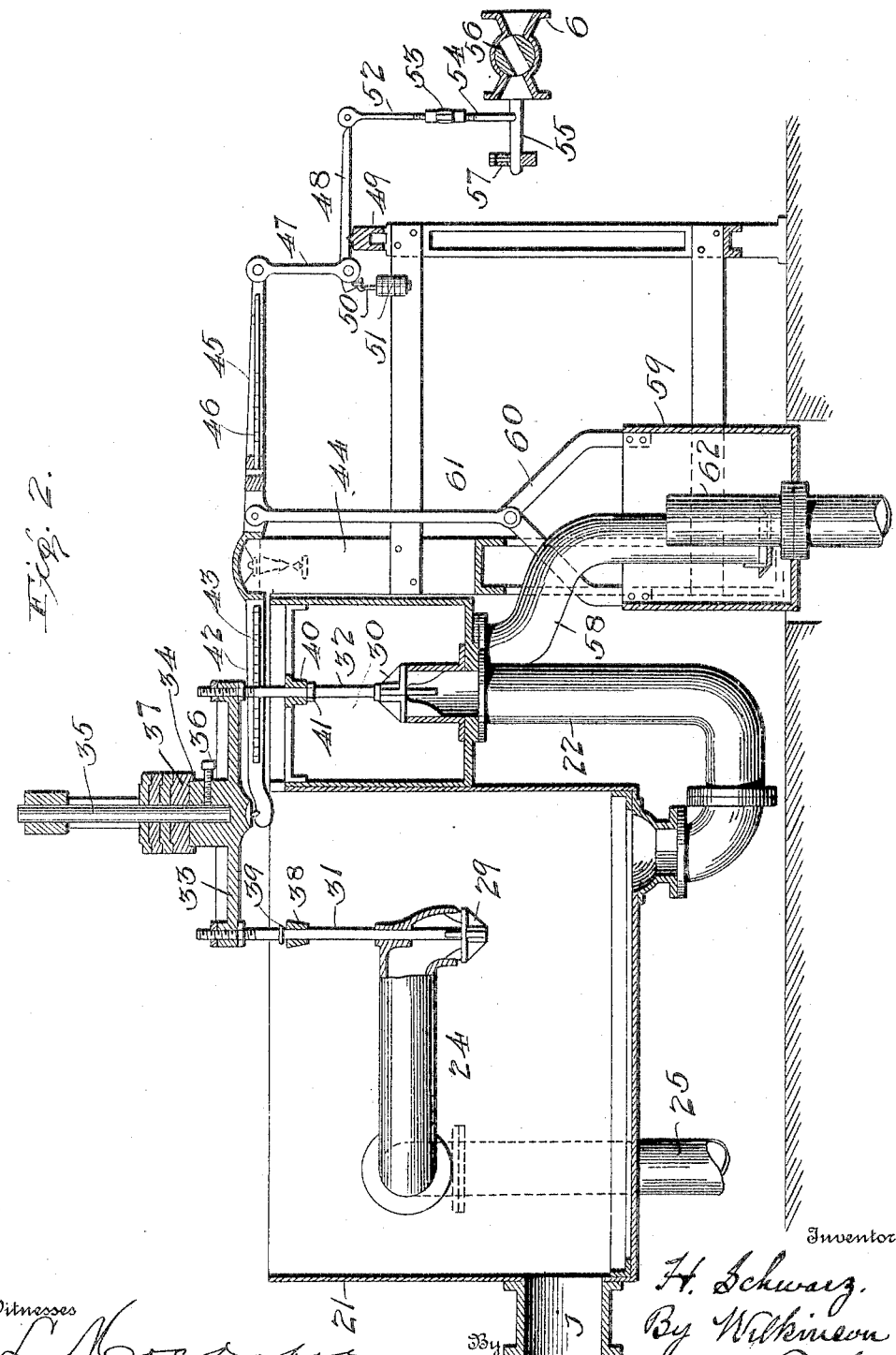

HENRY SCHWARZ, OF LONGMONT, COLORADO.

DIFFUSION PROCESS.

No. 802,331. Specification of Letters Patent. Patented Oct. 17, 1905.

Application filed November 15, 1904. Serial No. 232,877.

*To all whom it may concern:*

Be it known that I, HENRY SCHWARZ, a subject of the German Emperor, residing at Longmont, in the county of Boulder and State of Colorado, have invented certain new and useful Improvements in Diffusion Processes; and I do hereby declare the following to be a full, clear, and exact description of the invention, such as will enable others skilled in the art to which it appertains to make and use the same.

My invention relates to an improvement in diffusion processes and is designed especially for use in extracting sugar from beets, although it is not confined to such use.

The object of my invention is a process which will quickly and economically extract the juice from sugar-containing substances by means of a diffusion apparatus which is simple in structure and effective in operation and which after being once set will act automatically.

In the accompanying drawings, which illustrate an apparatus suitable for carrying out my process, Figure 1 is a longitudinal vertical section, partly in elevation, of my improved apparatus; and Fig. 2 is a cross-section of a part of the same.

$a$ represents a vertically-arranged cylinder supported in any desired way. The lower end of this cylinder is curved, as shown at $b$, and communicates with the lower end of another smaller cylinder $c$, which is arranged at an angle thereto, as shown. The upper part of the cylinder or tube $a$ is open and acts as a hopper into which the beets are delivered through an opening $d$.

$e$ represents the pulley which drives the slicer, and one or more slicers may be used for each cylinder.

Near the top of the cylinder $a$ are a series of screens $f$, $g$, and $h$, varying in mesh, for the purpose of thoroughly separating the juice from the solid matter. These are contained within a cylindrical portion $i$, which surrounds the portion $a$ and is of larger diameter. The cylinder $i$ is communicative, by means of a pipe $j$, with the juice-tank.

The cylinder $a$ near its center is provided with an inverted conical portion $k$, which serves to slightly pack the sliced beets together. Above and below the conical portions $k$ are screens $l$ and $m$, and between these screens and outside the conical portion $k$ is a chamber formed by a part of the cylinder $a$, a casing $n$ parallel thereto, and cross-casings $o$ and $p$ connecting them. Within this chamber steam or other material for heating the fluid may be forced through pipes by connections not shown. A series of tubes $q$ pass through the casings $o$ and $p$ and serve to conduct the juice mingled with water from the space outside of the screen $m$ to the space outside of the screen $l$. This construction affords a means for allowing the circulation of water around the sliced beets when, as said before, they are slightly packed together in the inverted conical portion $k$.

The cylinder $c$ is provided at its discharge end with a tapering conical portion $r$. Near the middle is a shorter tapering conical portion $s$, and a third one, $t$, is located near the bottom. Through the cylinder $c$ runs the shaft $u$, which is provided with conveyer-flights $v$. Within the portions $r$, $s$, and $t$ instead of the conveyer-flights screw conveyers $w$ are mounted for the purpose of positively forcing the sliced beets upward through the cylinder $c$. $x$ represents a discharge-trough for the sliced beets after they have been subjected to the operation of diffusion, and this trough may either lead to a waste-heap or to a press, if desired.

My apparatus is designed to extract practically all of the juice from the sliced beets in a single operation and to deliver them from the top of the cylinder $c$ in a substantially dry condition; but, if necessary, they may be passed through another diffusion apparatus or be subjected to the action of a pulp-press. The conical portion $r$ is provided with an internal screen $z$, parallel thereto, by means of which as the beets are forced upwardly to the discharge end of the cylinder $c$ the juice is allowed to run out through the screen $z$ into the space between said screen and the tapering portion $r$. Braces 1 are preferably used between the screen $z$ and the tapering portion $r$ to prevent the screen from buckling. Nearly all of the juice is expressed from the sliced beets by the time they are passed through the lower portion of the screen $z$, and a tube 2 is provided to conduct back said juice into the cylinder $c$. An additional tube 3, however, is provided to carry off the few remaining drops that pass through the upper part of the screen $z$, which tube delivers into any suitable receptacle. The tube 2 at its lower end enters an enlargement 4 of the cylinder, which is provided with an internal circular screen 5. The water passes downward through the tube 2, through the screen 5, and down through the cylinder $c$. Water in regulated quantities is admitted through the pipe 6 at one side of the screen, preferably opposite the pipe 2. The water and the juice pass downward through the cylinder $c$ and upward through the cylinder $a$, following the line of least resistance. The packing of the sliced beets in the conical portion $r$ prevents the water from passing upward, and this downward motion through the cylinder $c$ and upward through the cylinder $a$ is assisted by the injectors, which will hereinafter be referred to.

Just above and below the conical portion $s$ are enlargements 7 and 8, within and parallel to which are the screens 9 and 10. Pipes 11 and 12 passing around the conical portion $s$ connect these enlargements and afford a passage for the juice around the conical portion $s$, where of course the sliced beets are somewhat packed together. Connected with each of these pipes is an injector, and the points where the injectors enter the pipes are shown at 13 and 14, respectively. Just above the conical portion $t$ is an enlargement 15, within which is the circular screen 16. Connected with the space between the screen 16 and the enlargement 15 is a pipe 17, which affords a passage for the juice down into the lower part of the cylinder $c$, where it joins the lower part of the cylinder $a$. Connected to this pipe 17 is an injector, the point of entrance of said injector into said pipe being indicated at 18. Surrounding the pipe 17 at the point where it discharges into the lower part of the cylinder $c$ is a shield 19, provided with a screen 20, which prevents the sliced beets from clogging up the pipe 17.

The juice passing through the pipe $j$ enters the circulating-tank 21 through the pipe $j$. Thence it passes through the overflow-pipe 22 into the overflow-tank 23. In some instances, however, the whole or a part of said juice may pass outwardly from the tank 21 into the pipe 24 and thence through the pipes 25, 26, and 27 back into the central part of the cylinder $a$, this circulation being caused by a centrifugal pump located between the pipes 25 and 26 and indicated in the drawings at 28.

The pipe 24 may be closed by the valve 29, and the overflow-pipe 22 may be closed by the valve 30. These valves are connected by valve-rods 31 and 32 to a cross-piece 33, so that they move simultaneously. In a hollow projection 34, centrally located in the cross-piece 33, is the rod or shaft 35, which is fastened by a screw 36. Weights 37 are adapted to fit over the top of the projection 33 and are kept in place by the rod or shaft 35. Of course the number of weights may be varied as desired. The valves 29 and 30 are so related to each other that when one is fully closed the other is open. The valve-rod 31 passes through a brace 38, fastened to the sides of the tank 21, and is also provided with a collar 39, which limits the downward movement of said rod. The valve-rod 32 passes through a similar brace 40, attached to the sides of the tank 23, and said rod is provided with a collar 41, which limits its upward movement. As the rods are rigidly connected to the cross-piece 33 at right angles thereto, the upward and downward movement of these valves is limited by the collars 39 and 41. The cross-piece 33 is centrally mounted on a knife-edge bearing on one arm 42 of a scale-beam, which arm is provided with graduations 43. This scale-beam is mounted on a knife-edge bearing on the upright scale-support 44. The other arm 45 of this scale-beam is provided with graduations 46 and has attached to its outer end a rod 47, and a lever 48 is suspended on a knife-edge bearing on the lower end of the arm 47, which is mounted on a knife-edge bearing on the outer end of the scale-arm 45. The lever 48 is mounted on a knife-edge bearing on a support 49, and to one end of the lever 48 is attached a hook-support 50, on which weights 51 are removably placed. On the opposite end of the lever 48 on a knife-edge bearing is pivoted a vertical screw-threaded rod 52, which is connected by a turnbuckle 53 with a screw-rod 54, which is pivotally attached to an arm 55, which operates a valve 56, located in the pipe 6, which delivers water into the cylinder $c$. The upward movement of the arm 55 is limited by the stop 57.

Connected to the bottom of the tank 23 is the pipe 58, which delivers into the scale-tank 59, which is supported by a bail 60, pivotally connected to a rod 61, which is mounted on a knife-edge bearing on the scale-arm 45 and which of course moves up and down with the movement of said scale-arm. The scale-tank 59 has projecting into it and fastened to the bottom thereof an overflow-pipe 62, from which the juice overflowing through the pipe 62 passes into the pipe 63, the pipe 62 telescoping into the upper part of the pipe 63, as shown in Fig. 1. The pipe 63 connects with the lower part of the measuring-tank 64, from whence the juice after it is measured passes through the pipe 65 into the carbonation-tanks. Automatic means (not shown) are provided in the measuring-tank for emptying the same when a certain quantity of juice has accumulated in the measuring-tank.

The parts are so adjusted, and more especially the weights 37 and 51, that the scale-arm 45 will move down only when the juice has reached the desired point of concentration. Until that point has been reached the valve 30 will be practically closed and the valve 29 open and the fluid kept circulating through the tank 21 down through the connecting-pipes and pump and upwardly through the upper part of the cylinder $a$. When, however, the juice becomes heavy enough to depress the scale-tank 59, it will be delivered into the measuring-tank and thence to the refining apparatus. This part of the apparatus, therefore, works automatically.

Connected to the lower part of the cylinder $c$ are means for cleaning the apparatus, (shown in Fig. 1,) consisting of a pipe 66, which is connected to a pump and is provided with a valve 67 and a pipe 68, provided with a valve 69, which is connected to a sewer or other discharge-pipe 70. In cleaning the apparatus the sliced beets are completely discharged from the tube or cylinder $c$, the valve in the water-inlet pipe 6 is closed, the valve 67 opened, and the juice is drawn out through the pipe 66 by the pump. After this the valve 67 is closed and the valve 69 opened, and the whole apparatus is cleansed by passing water therethrough which runs into the sewer.

The shaft $u$ is driven by a bevel gear-wheel 71, which meshes with a similar gear-wheel on the shaft 72, which is driven by a belt running from the driving-shaft 73, which also drives the slicers.

The operation is as follows: The apparatus is filled with water up to the conical portion $k$ in the cylinder $a$. This water is heated by means of the injectors connected to the pipes 12, 13, and 17. The sliced beets are then delivered into the cylinder $a$ until they have reached the level of the pipe $j$. The shaft $u$ is then set in motion, and as soon as the sliced beets reach the cone portion $s$ the water is turned on through the pipe 6, the valve-arm 55 being connected to the arm 52 by means of the turnbuckle 53 and rod 54. At the same time the injectors connected to the pipes 11, 12, and 17 are started, and steam or other heating means is delivered into the space around the pipes $q$, and the centrifugal pump 28 is started in operation. After this the operation is continuous and automatic, as has already been described in connection with the several parts.

While I have thus described my invention, I wish it to be distinctly understood that I do not limit myself to the exact means shown and described, as these might be varied greatly and still be within the scope of my invention.

I claim—

1. The herein-described diffusion process, which consists in reducing the material to be treated into small pieces, causing said material to continually travel in one direction through a confined space and causing a stream of water to travel in the opposite direction through said confined space, subjecting the material under treatment to pressure repeatedly during its travel through said space, allowing the water to pass around the material during said pressing operations, and automatically returning the juice-charged water into contact with said material until it has reached the required density, substantially as described.

2. The herein-described diffusion process which consists in comminuting the material under treatment, causing it to continually travel in one direction through a confined space, causing a stream of heated water to pass continually through said confined space in the other direction, subjecting the material under treatment to pressure repeatedly during its travel through said confined space, automatically returning the juice-laden water into contact with said material until it has reached the required density and then automatically conducting off the juice-laden water for further treatment, substantially as described.

3. The herein-described diffusion process, which consists in causing the material to be treated to travel in one direction, causing a solvent liquid to travel in the opposite direction, causing said liquid to repeatedly pass through said material until it has reached the required density, and automatically discharging the liquid as soon as it has reached the required density, substantially as described.

4. The herein-described diffusion process, which consists in comminuting the material to be treated, causing it to continually travel in one direction through a confined space, causing a stream of heated water to continually pass through said confined space in the other direction, subjecting the material under treatment repeatedly to pressure during its travel through said confined space, automatically and repeatedly returning the juice-laden water into contact with said material until it has reached the required density, and automatically conducting off the juice-laden water for further treatment as soon as the required density has been reached, substantially as described.

In testimony whereof I affix my signature in presence of two witnesses.

HENRY SCHWARZ.

Witnesses:
GEO. T. RUSSELL,
MORTIMER J. ELY.